Patented May 16, 1950

2,507,688

UNITED STATES PATENT OFFICE 2,507,688

SMOOTH, MOBILE POLYVINYL CHLORIDE COATING COMPOSITIONS

Noel Armstrong, Newburgh, N. Y., assignor to E. I. du Pont de Nemours & Company, Wilmington, Del., a corporation of Delaware No Drawing. Application March 1, 1946, Serial No. 651,389

8 Claims. (Cl. 260—23)

This invention relates to new compositions of matter and more particularly to vinyl chloride polymer-plasticizer pastes. Specifically, this invention relates to vinyl chloride polymer-plasticizer paste containing a volatile diluent mixture.

Vinyl chloride polymers are being used in large amounts in a wide variety of applications. Many of these applications involve the use of these resins in a plasticized form as coating for textiles, metals, and the like. In order to apply the resin composition it is often necessary to dissolve the resin in a volatile solvent which is volatilized after the coating is in place. This operation is time consuming in itself, but it also makes necessary the recovery of the volatile solvent which adds to the cost and, in addition, the process often requires an excessive number of applications to build up the desired coating thickness due to the limited solubility of the resin. Although polyvinyl chloride-plasticizer pastes containing a high proportion of resin and plasticizer are known, improved coating properties are desirable.

This invention has as its general object the preparation of plasticized vinyl chloride polymer coating compositions without the use of high proportions of volatile organic solvents, which contain a high proportion of the film-forming composition showing superior coating properties. A specific object is the preparation of plasticized vinyl chloride polymer coating compositions which are stable with respect to viscosity after storage. Other objects will appear as the description of the invention proceeds.

These objects are accomplished by the following invention which comprises the preparation of compositions suitable for coating applications by mixing finely divided vinyl chloride polymer, plasticizer, and a special diluent mixture which is compatible with the plasticizer and has no solvent action on the resin.

Mobile pastes which show superior coating properties and which contain only low proportions of non-solvent volatile diluents can be prepared by mixing finely powdered polyvinyl chloride resin, plasticizer, and a diluent mixture which is compatible with the plasticizer but has no solvent action on the resin in an open vessel with stirring or in mechanical mixers well known in the art without the aid of heat and pressure. In order to prepare smooth free flowing pastes, the resin and pigments must be reduced in particle size not over 5 microns in diameter and preferably not over 1.5 microns in diameter. If pigments and fillers are used, it is desirable first to grind a mixture of plasticizer and filler and/or pigments, then mix this composition with the finely powdered resin with the aid of low proportions of volatile organic diluents.

The following specific examples are given by way of illustration and not limitation in which the percentages are by weight:

Example I

A polyvinyl chloride paste of the following composition was prepared:

| | Per cent |
|---|---|
| Polyvinyl chloride powder | 37.8 |
| Butyl acetyl ricinoleate | 15.7 |
| Tricresyl phosphate | 10.2 |
| Blown castor oil | 1.1 |

Pigments:
| | |
|---|---|
| Bone black, 19.27% | |
| CP chrome green dark, 4.67% | |
| CP chrome green light, 2.55% | 35.2 |
| TiO₂ on barium base, 5.68% | |
| Barytes, 67.83% | |

The pigments were previously ground in the plasticizers in a conventional manner. The pigment-plasticizer mixture was added to a worm gear type of mixer and then the polyvinyl chloride powder having an average particle size of 2.0 microns in diameter was added to the mixer. The dry powder was mixed with the pigment-plasticizer mixture to obtain a heavy paste, which was too heavy for practical doctor knife coating. The above composition was diluted to 90% solids with various ratios of ethyl alcohol and V. M. & P. gasoline. The viscosity of the diluted compositions was measured with a Stormer viscosimeter employing 100 revolutions with a 1000 g. weight.

The viscosity results initially and after 1 day, 2 days, 4 days, 6 days, and 14 days were as follows:

ethyl alcohol or V. M. & P. gasoline alone was too stiff for doctor knife coating.

| Diluent—Representing 10% of Composition | | Stormer Viscosity 100 Revolutions—1,000 g. Weight | | | | | |
|---|---|---|---|---|---|---|---|
| Ethyl Alcohol 2B—Formula | V. M. & P. Gasoline | Initial | After 1 day | After 2 days | After 4 days | After 6 days | After 14 days |
| | | Seconds | Seconds | Seconds | Seconds | Seconds | Seconds |
| 100 | ---- | (¹) | (¹) | (¹) | (¹) | (¹) | (¹) |
| 75 | 25 | 360 | 460 | 600 | 690 | 790 | 900 |
| 60 | 40 | 60 | 150 | 200 | 257 | 279 | 324 |
| 50 | 50 | 60 | 150 | 180 | 215 | 218 | 237 |
| 40 | 60 | 49 | 100 | 152 | 180 | 185 | 198 |
| 30 | 70 | 46 | 120 | 196 | 242 | 264 | 290 |
| 25 | 75 | 48 | 140 | 205 | 280 | 312 | 350 |
| 15 | 85 | 140 | 390 | 570 | 785 | 920 | 987 |
| ---- | 100 | (¹) | (¹) | (¹) | (¹) | (¹) | (¹) |

¹ Too heavy to determine.

From the above table it is noted that a 10% dilution of the heavy paste with various mixtures of ethyl alcohol and V. M. & P. gasoline result in lower viscosities, both initially and after aging, than when either the ethyl alcohol or V. M. & P. gasoline is used alone as the diluent.

*Example II*

The undiluted heavy paste, described in Example I was also diluted with 10% of the same diluent mixtures as described above, and 2% of a surface active agent, e. g., one of the petroleum hydrocarbon sodium sulfonates such as alkanol WXN based on the resin was also added and the following viscosity results were obtained:

| Diluent—Representing 10% of Composition | | Stormer Viscosity 100 Revolutions—1,000 g. Weight | | | | | |
|---|---|---|---|---|---|---|---|
| Ethyl Alcohol 2B—Formula | V. M. & P. Gasoline | Initial | After 1 day | After 2 days | After 4 days | After 6 days | After 14 days |
| | | Seconds | Seconds | Seconds | Seconds | Seconds | Seconds |
| 100 | ---- | 90 | 170 | 250 | 320 | 395 | 520 |
| 80 | 20 | 30 | 55 | 66 | 75 | 87 | 92 |
| 60 | 40 | 17 | 25 | 31 | 42 | 46 | 49 |
| 50 | 50 | 14 | 19 | 22 | 30 | 32 | 34 |
| 40 | 60 | 14 | 17 | 21 | 25 | 27 | 30 |
| 30 | 70 | 13 | 17 | 22 | 29 | 30 | 32 |
| 20 | 80 | 15 | 20 | 24 | 33 | 34 | 37 |
| ---- | 100 | 22 | 32 | 46 | 69 | 90 | 108 |

In all the above runs 2% of a wetting agent, e. g., alkanol WXN was used based on the weight of the resin.

The use of a wetting agent to facilitate the formation of mobile pastes is disclosed and claimed in copending application S. N. 675,309, filed June 7, 1946.

It is apparent that there is a definite advantage with respect to reduced viscosity and stability by the use of various mixtures of ethyl alcohol and V. M. & P. gasoline in the cases where a wetting agent is used as well as in cases where such wetting agents are not used. From a practical viewpoint in the case of the paste containing 10% of a diluent mixture of 40 parts ethyl alcohol and 60 parts V. M. & P. gasoline and no surface active agent, an increase in viscosity from 49 seconds to 198 seconds after 14 days as measured by the Stormer viscosimeter is considered to be a stable composition for plant coating operations, whereas the same composition diluted with either

*Example III*

Polyvinyl chloride pastes of the following composition were prepared:

| | Per cent |
|---|---|
| Vinyl chloride polymer powder | 39.0 |
| Solvent plasticizer | 26.0 |
| Pigment and filler | 35.0 |
| | 100.0 |

To this heavy paste sufficient volatile diluent was added until the solids content was between 80% and 90%. When so diluted the ratio of resin to plasticizer may vary between 50 parts of resin to 50 parts of plasticizer, and 70 parts of resin to 30 parts of plasticizer. The volatile diluent with which the paste was thinned contained about equal parts of ethyl alcohol and V. M. & P. gasoline. The resulting paste was then spread on a fabric and after heating for a short period was converted into a tough durable coating.

In place of polyvinyl chloride in the examples substantially similar results will be obtained when the polyvinyl chloride is substituted in equal amount by other vinyl chloride polymers.

The vinyl chloride polymers that may be used include polyvinyl chloride and copolymers of vinyl chloride obtained by polymerizing vinyl chloride in the presence of other monomers copolymerizable therewith such as the diesters of fumaric or maleic acid including dimethyl, diethyl, dipropyl, and dibutyl fumarate and maleate, copolymers of vinyl chloride and esters of acrylic and alpha-chloroacrylic acid or methacrylic esters such as the methyl, ethyl or propyl esters, copolymers of vinyl chloride with vinylidene chloride and also copolymers of vinyl chloride and vinyl esters of organic acids such as vinyl acetate. These vinyl chloride copolymers and polymers can be prepared by polymerizing monomer or monomer mixtures in aqueous emulsions as is well known in the art. When copolymers are used polyvinyl chloride is present in major amount—usually about 95% polyvinyl chloride and 5% of the other component. To obtain the polymer in a suitable form for use in preparing the pastes of this invention, the polymers may be isolated from the dispersion by coagulation according to conventional methods such as by the addition of a salt solution, filtered and dried or by spray-drying the resin emulsion.

It is essential that the resin be in as finely divided form as possible in order to obtain mobile pastes and it may thus be necessary to subdivide the resin particles further. This may be accomplished by a variety of means known in the art such as ball milling or grinding. A convenient method to reduce the particle size of the resin consists in passing it through a "Micronizer" or "Mikroatomizer" which subjects the resin particle to a high velocity rotating motion in a confined chamber that causes the agglomerates to subdivide. It is particularly desirable that the resin particles have an average diameter of less than 2 microns as determined by the Fischer Sub Sieve Sizer (Goodan E. L. Smith, C. M. Ind. Eng. Chem. Analy. Ed. 12, 479–482 (1940)). However, for certain uses, such as cable lacquers where extremely smooth coatings are not required, larger resin particles, up to 5 microns average diameter, can be used.

It will be apparent from the above that the greatest advantages of the present invention will be obtained when from 15% to 75% alcohol and from 85% to 25% V. M. & P. naphtha is used to make up the diluent. The terms "V. M. & P. gasoline" and "V. M. & P. naphtha" are used synonymously in this application.

The liquid plasticizers that may be used in preparing the compositions of this invention include those high-boiling compatible materials which are poor solvents for the resin at room temperature but are solvent at elevated temperature. Plasticizers among others that may be used include tricresyl phosphate, di(butoxyethyl) phthalate, dibutyl phthalate, methoxyethyl acetyl ricinoleate, sebacic acid esters such as di(butoxyethyl) sebacate and combinations thereof or any high-boiling compatible plasticizer which is a poor solvent for the polymer at low temperatures but is a solvent at elevated temperatures. The proportion of liquid plasticizer that may be used in preparing the mobile pastes of this invention is dependent to a large degree on the proportion of other agents such as pigment and filler present in the final composition. In general, mobile pastes may be prepared from resin and plasticizer mixtures containing from 35 to 80% by weight of the plasticizer based on the weight of resin and plasticizer.

The pigments and fillers may be omitted to make colorless films and coatings if desired.

It is apparent that many widely different embodiments of this invention may be made without departing from the spirit and scope thereof, and therefore, it is not intended to be limited except as indicated in the appended claims.

I claim:

1. The composition of claim 8 in which a wetting agent is present.

2. The composition of claim 8 in which the particle size of the polymer is below 5 microns.

3. The composition of claim 8 in which the average particle size of the polymer diameter is less than 1.5 microns.

4. The composition of claim 8 in which the polymer is polyvinyl chloride.

5. The composition of claim 8 in which the polymer is a copolymer of vinyl chloride and diethyl fumarate.

6. The composition of claim 8 in which the polymer is a copolymer of vinyl chloride and vinyl acetate.

7. The composition of claim 8 which has approximately the following composition by weight:

| | Per cent |
|---|---|
| Polyvinyl chloride powder | 37.8 |
| Butyl acetyl ricinoleate | 15.7 |
| Tricresyl phosphate | 10.2 |
| Blown castor oil | 1.1 |
| Pigment | 35.2 | the said composition being dispersed in a mixture consisting of 40% ethyl alcohol and 60% V. M. & P. naphtha in amount sufficient to contain 90% solids and 10% diluent by weight.

8. A coating composition having a smooth, mobile and relatively stable consistency which comprises a finely divided polymer selected from the group consisting of homopolymers of vinyl chloride and copolymers thereof obtained by polymerizing at least 95% of vinyl chloride and up to 5% of a monomer copolymerizable therewith, from 35% to 80% by weight of a liquid plasticizer which is a solvent for the polymer at high but not low temperatures, and from about 10% to 20% by weight based on the total composition of a diluent consisting of 15% to 75% of ethyl alcohol and 85% to 25% of V. M. & P. naphtha by weight, the percentage of plasticizer being based on the combined weight of plasticizer and polymer.

NOEL ARMSTRONG.

REFERENCES CITED

The following references are of record in the file of this patent:

UNITED STATES PATENTS

| Number | Name | Date |
|---|---|---|
| 2,188,396 | Semon | Jan. 30, 1940 |
| 2,379,236 | Jenkins | June 26, 1945 |